April 8, 1941.                D. M. FULTON                2,237,815
                    ANTIGLARE HEADLIGHT FOR VEHICLES
                         Filed May 9, 1939
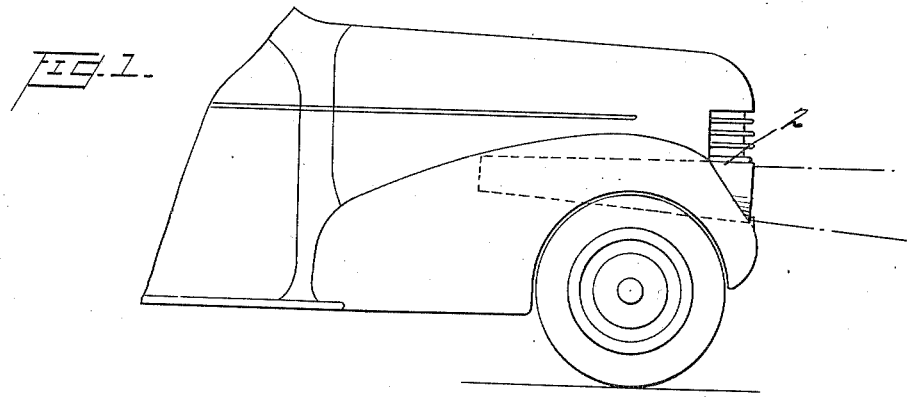
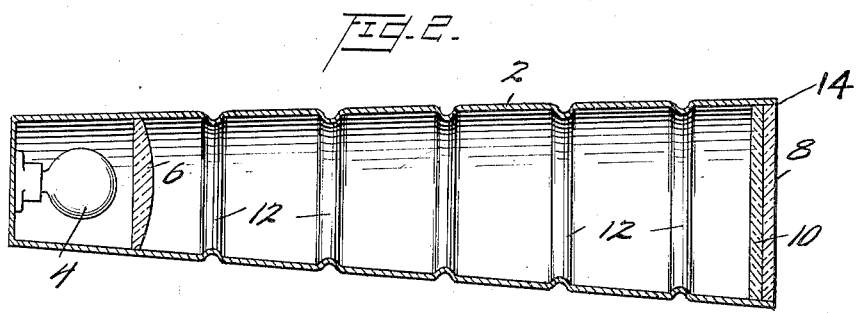
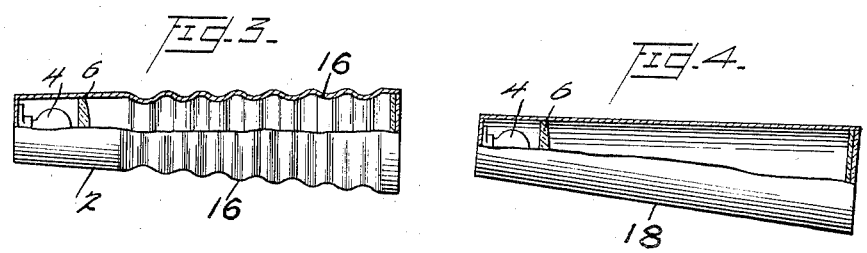
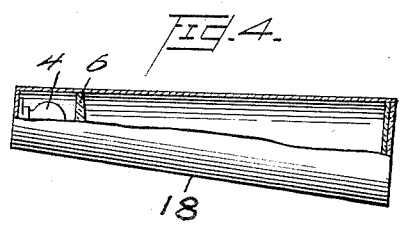
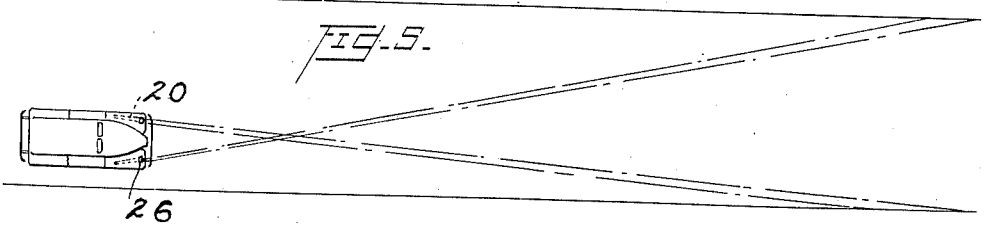
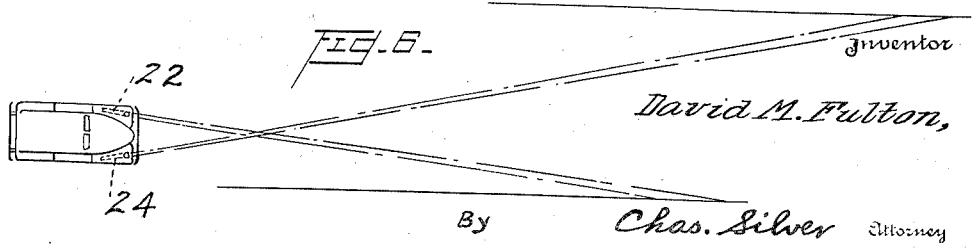
Inventor
David M. Fulton,
By Chas. Silver  Attorney Patented Apr. 8, 1941

2,237,815

UNITED STATES PATENT OFFICE 2,237,815

ANTIGLARE HEADLIGHT FOR VEHICLES

David M. Fulton, Baltimore, Md., assignor to Jean Fulton and Gladys Fulton, both of Baltimore, Md.

Application May 9, 1939, Serial No. 272,719

1 Claim. (Cl. 240—48.4)

This invention relates to antiglare headlights for vehicles and has particular reference to antiglare headlights for motor vehicles.

Among the objects of this invention is to provide headlights for automobiles which will afford adequate illumination of the road for safe driving at night by the operator of the vehicle and eliminate the present dangers and perils to motor vehicle operators and others approaching from an opposite direction.

More specifically it is an object of this invention to provide antiglare headlights which will project no dazzling or blinding light into the faces and eyes of operators of motor vehicles approaching from the opposite direction.

Other, further and more specific objects of this invention will become readily apparent to persons skilled in the art from a consideration of the following description, when taken in conjunction with the accompanying drawing wherein:

Fig. 1 is a fragmental side view of an automobile showing the location of my antiglare headlights with reference to other parts of the automobile.

Fig. 2 is a cross-section through an antiglare headlight constituting the preferred embodiment of my invention.

Fig. 3 is a side view, on a reduced scale, of a modified form of my invention, a portion of the device being broken away to show the internal construction thereof.

Fig. 4 is a view, similar to Fig. 3, showing another modification of my antiglare headlight.

Fig. 5 is a top plan view of a roadway showing the path of the rays of light projecting from the headlights of an automobile equipped with my invention.

Fig. 6 is a view, similar to Fig. 5, showing the projecting rays from the headlights of the automobile in a different relation to each other from that shown in Fig. 5.

My invention comprises an elongated shield or tunnel 2, preferably tapering, and having at the smaller or rear end a light 4, preferably an electric lamp. A lens 6 is disposed immediately in front of the lamp and at the large or front end of the tunnel is the front cover 8. This cover 8 may be of ordinary transparent material, such as glass or cellulose ester material. In order that the rays of light issuing from the lamp 4 may be seen better in fog and mist, I provide the translucent plate 10, preferably of light yellow tint. The substance, commercially known as "Insurock," has been found very satisfactory for my purpose. I prefer to make the interior of the tunnel 2 with a plurality of ridges or projections 12.

As an important aid for avoiding or greatly diminishing the projection of dazzling light into the faces and eyes of operators of motor vehicles approaching from the opposite direction, the shield or tunnel 2 extends forwardly of the lens 6 for a length equal to three or more times the cross-sectional width of the front end 14 of the shield 2. Under such conditions, most or nearly all of the rays of light projected from the lens 6 will strike the inner walls of the shield one or more times before emerging from the shield and will undergo reflection before issuing into the roadway in front of the automobile. The light resulting from these reflected rays is free of nearly all of the vexatious "dazzle," but serves very effectively and adequately to illuminate the road for safe driving. I have found that a tunnel or shield five inches in diameter at the end where the lamp 4 and lens 6 are located, six inches in diameter at the front end and three feet long gives satisfactory results.

The ridges or projections 12 which are nonlongitudinal and preferably circumferential also serve to bring about more reflections of the rays of light projected from the lens 6 before emerging from the shield 2 and thereby further reduce the objectionable "dazzle" or blinding effect of the light. In Fig. 3 the corrugations 16 perform the same function as the ridges 12 in Fig. 2 and in some instances are preferable to the latter. The forms of shields shown in Figs. 2 and 3 are preferable to the plain type of shield 18 shown in Fig. 4.

It is to be understood that my invention is not limited to shields with inner walls having ridges, projections or undulations of the kind and arrangement shown in Figs. 2 and 3 but other forms of protuberant, such as spiral projections, knobs, etc., on the inner walls of the shield are within the scope of my invention.

The light issuing from the headlights of an automobile equipped with my invention is a soft non-glaring light which does not blind or dazzle persons in a car approaching from the opposite direction. This light is highly efficient and has been found, by practical test and experience, to illuminate the road adequately and effectively for safe night driving when the lamp 4 is of candle power normally employed in automobile headlights. Also, satisfactory results have been obtained with lights of lower candle power than those normally employed for this purpose.

The tunnels or shields of my invention are mounted on automobiles as shown in Figs. 5 and 6, so that the rays emerging from one shield will be inclined to that emerging from the companion shield and cross each other a short distance in front of the automobile. The projected rays from each shield are also inclined to the longitudinal axis of the automobile and the path of travel of the automobile wheels. The effect is to cast the light across the road from each side of the automobile, instead of merely projecting the light in front of the automobile. By this means the road is illuminated over a wider area and at the same time the light does not exert a sustained dazzling or blinding effect upon the occupants of an automobile approaching from the opposite direction.

I have found it advantageous to mount these shields so that the light from the shield on the right hand side of the automobile will be projected at a greater angle from the direction of the wheels than the angle of inclination to the wheels of the rays emerging from the shield on the left hand side of the automobile, thereby shortening the diagonal path of the rays across the road to the left of the driver and bringing the illuminated zone to the left of the driver closer. This is very helpful for safe operation of the automobile. The light rays from each of the shields 26 and 24 on the right hand side of the automobiles shown in Figs. 5 and 6, respectively, are at the same angular deviation from the direction of the wheels, but the rays of light emerging from the shield 22 on the left hand side of the automobile in Fig. 6 are at a greater deviation from the direction of its longitudinal axis and its wheels than the rays of light emerging from the shield 20 at the left of the automobile in Fig. 5 are inclined to the direction of its longitudinal axis and its wheels. However, choice between the different arrangements of shields shown in Figs. 5 and 6 or of any departures therefrom, while appropriating the idea of the crossing of the rays projected from the companion headlights, can be carried out to meet particular conditions or adaptations to particular needs.

The primary function of the headlights on automobiles is to illuminate the road and the space immediately above the road. I, therefore, mount my shields, as shown in Fig. 1, as low as the particular structure of an automobile will permit; usually at a level midway between the top and bottom of the automobile body. This serves to throw the light upon the road instead of into the space remotely above the road.

As demonstrated by practical operation, the use of the novel features of my invention results in considerable reduction of the hazards of automobile operation and at the same time renders automobile operation more pleasant and satisfactory. In travelling through fogs and mists and in drizzly weather, the chromatic plate 10, preferably of slight translucency, is helpful and desirable.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claim.

I claim as my invention:

In a motor vehicle, a headlight on each side of said vehicle, each of said headlights having a light, a lens in front of and close to said light, an elongated tunnel for each headlight, said light and said lens being disposed in the rear part of said tunnel, each of said tunnels being of sufficient length and having non-longitudinal protuberances on the inner wall thereof for effecting reflection of most of the rays of light after emerging from said lens and before issuing from said tunnel, and each of said tunnels being fixed to said vehicle and constrained to project the rays of light emerging therefrom close to the ground, diagonally across the road, and in a direction to intersect the rays of light emerging from the companion tunnel on said motor vehicle, the rays of light emerging from the tunnel on the right hand side of the automobile being at a greater angle from the direction of the wheels than the angle of inclination to the direction of the wheels of the rays emerging from the tunnel on the left hand side of the automobile.

DAVID M. FULTON.